United States Patent
Peardon

[11] 4,379,438
[45] Apr. 12, 1983

[54] HORSE SPA

[76] Inventor: Richard Peardon, 22100 Burbank Blvd. F-152, Woodland Hills, Calif. 91367

[21] Appl. No.: 199,030

[22] Filed: Oct. 20, 1980

[51] Int. Cl.³ ...................... A61D 11/00; A01K 29/00
[52] U.S. Cl. .................................... 119/29; 119/158; 4/492; 4/493
[58] Field of Search ...................... 119/29, 158; 4/492, 4/493, 507, 542, 543, 568

[56] References Cited

U.S. PATENT DOCUMENTS

| | | | |
|---|---|---|---|
| 2,611,341 | 9/1952 | Paris | 119/158 |
| 2,661,865 | 12/1953 | Wendt | 119/158 X |
| 2,719,307 | 10/1955 | Reid | 119/158 |
| 2,808,031 | 10/1957 | Sollars et al. | 119/158 |
| 3,060,892 | 10/1962 | Schantz | 119/158 |
| 3,979,096 | 9/1976 | Zieger | 4/615 X |
| 4,236,489 | 12/1980 | Carra | 119/158 |

*Primary Examiner*—Gene Mancene
*Assistant Examiner*—Robert P. Swiatek
*Attorney, Agent, or Firm*—John J. Posta, Jr.

[57] ABSTRACT

An improved horse therapy spa unit is provided which comprises a unitary housing which defines a preferably open-topped water-tight horse therapy compartment and integral hot water and cold water chambers on opposite sides thereof. A water heater and a water refrigerator are disposed in the housing. Water circulation pumps, valves and conduits interconnect the chambers, heater, refrigerator and horse therapy compartment. A water aerator is included in the circulation system and upper and lower sets of jet spray nozzles are positioned in the walls of the therapy compartment. A control panel on the outside of the housing controls the circulation and temperature regulating systems. A hand-held pulsed jet spray unit may be included in the housing, as may radiation lamps disposed in ports in the therapy compartment, a container for medicine and/or disinfecting chemicals, a feed bag and a feed storage compartment. The front end of the therapy compartment is curved to allow the horse to rest its neck, and side ramps are provided on the exterior of housing to aid handlers in guiding the horse and administering treatment thereto. A filtration system removes gross solid refuse and also finer refuse particles from the therapy compartment. The housing is portable and adapted to rest on the ground in a stable position, the water chambers acting as ballast. Retractable wheels are connected to the housing to permit easy transportation of the spa to locations where needed.

13 Claims, 5 Drawing Figures

HORSE SPA

BACKGROUND OF THE INVENTION

1. Field of the Invention

The present invention generally relates to horse treatment means and more particularly to an improved horse spa.

2. Prior Art

Horses, particularly of the racing type, frequently require physical therapeutic treatment for damages, sore and swollen limbs, muscle sprains, spasms and pulls, various types of debilitating diseases and other ailments. Horses are somewhat difficult to treat, being easily frightened. Heretofore, rigs such as the sling disclosed in U.S. Pat. No. 3,835,815 have been used to immobilize the horse during treatment, but place a considerable strain on the horse, can frighten it and can interfere with access to the horse's body for treatment.

Horse spas and/or horse swimming pools heretofore utilized for therapeutic purposes have generally been expensive permanent immobile structures built below ground and requiring down ramps for access thereto. See, for example, U.S. Pat. Nos. 3,691,995, 4,183,329 and 4,197,815.

Unfortunately, some horses become frightened when having to traverse steep ramps and also when having to move to a below-ground position. Moreover, such structures are not readily available when the need arises, as it sometimes does during transport.

Units which have been made portable are generally of limited utility, such as the bath with treadmill shown in U.S. Pat. No. 3,485,213, and are usually solely for exercise purposes and not for therapeutic, resuscitative purposes. Inasmuch as race horses are frequently transported from race track to race track at all times of the year, there is a continuing need for a portable therapeutic horse spa which is stable, soothes rather than frightens the horse and can provide a variety of beneficial treatments. The spa should also be inexpensive, durable and be capable of being used above ground.

It would also be desirable to have a therapeutic unit which generally conforms to a horse's natural environment. In this regard, it might be noted that racehorses generally are stabled in above ground stalls while at the racetrack and are trained in four-walled starting gates which they enter through a rear, closeable door. A preferred design of a horse spa should incorporate a similar design to make the horse comfortable and easy to treat.

SUMMARY OF THE INVENTION

The foregoing needs are satisfied by the improved horse spa of the present invention. The horse spa is substantially as set forth in the Abstract above. It includes a portable housing adapted to be set on the ground and which has a preferably open-topped central horse therapy compartment flanked by hot and cold water chambers serving to stabilize the housing against tilting. The compartment has a water-tight door and the housing has outside ramps to provide ready access to the therapy compartment and horse when the horse is placed therein.

In a preferred embodiment, the housing has hydraulically retractable wheels for improved mobility. The spa includes a water circulation system with pump, feed lines, etc., a water heater, a water refrigerator, a water aerator and a water purification system with pumps and filters interconnected within the housing to deliver purified aerated temperature controlled water to lower and upper sets of spray jet nozzles in the therapy compartment and create a whirlpool effect therein for maximum therapy. The front of the therapy compartment is curved to support a horse's neck and a feed bag is releasably mounted thereagainst. Feed, medicine and chemical storage compartments may be provided in the housing, as well as hand-held flexible pulsating jet spray nozzles, hand-held ultrasonic vibrators, radiation lamps and the like. Other features are as set forth in the following detailed description and accompanying drawings.

BRIEF DESCRIPTION OF THE DRAWINGS

FIG. 5 is a schematic side elevation, partly broken away, of a second preferred embodiment of the improved horse spa of the present invention.

DETAILED DESCRIPTION OF THE PREFERRED EMBODIMENT

Figure 1:
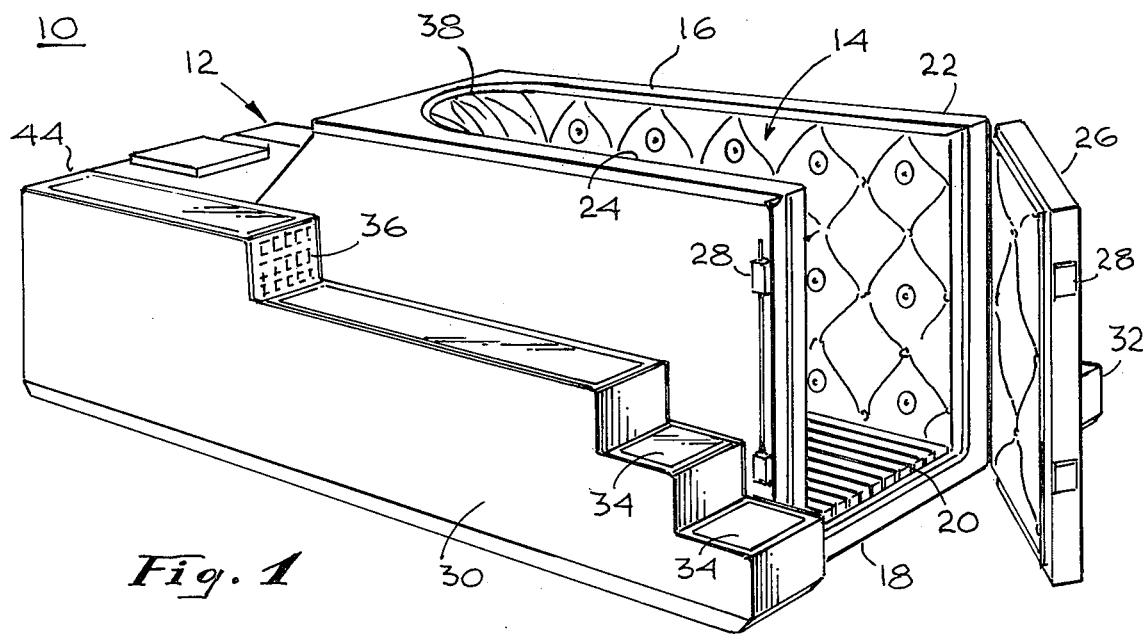
FIG. 1 is a schematic perspective view of a first preferred embodiment of the improved horse spa of the present invention.

Now referring more particularly to FIGS. 1-4 of the accompanying drawings, a first preferred embodiment of the improved horse spa of the present invention is schematically depicted therein. Thus, spa 10 is shown which is portable and adapted to rest on the ground, with easy non-frightening access thereto by a horse. Spa 10 comprises a hollow housing 12 of metal, plastic, wood or the like defining an elongated central horse therapy compartment 14 having an open top 16, a closed bottom 18 fitted with a mesh screen or other type of flooring 20 preferably containing openings, padded upstanding sidewalls 22 and 24 and a padded rear door 26 fitted with a lock 28. Door 26, when closed, renders compartment 14 water-tight.

The exterior of housing 12 is contoured on the sides thereof to provide ramps 30 and 32 having rear steps 34, to assist a handler in guiding a horse into and from compartment 14 and treating the horse in compartment 14. Housing 12 is also provided with a control panel 36, as shown in FIG. 1, for controlling the temperature and circulation of water to and from compartment 14, as hereinafter more fully described.

Housing 12 is curved forwardly in an arc in the area defining the front end 38 of compartment 14 to maintain a horse's head above the water line, when in compartment 14, and to rest its neck thereagainst. A removable feed bag 40 may be disposed on a portion 42 of housing 12 adjacent end 38 to enable the horse to feed while in compartment 14, thus calming the horse.

A lower portion 44 of housing 12 may project forward of portion 42 and provide an area for location of part of an integral insulated cold water chamber 46 and integral insulated hot water chamber 48 (FIGS. 2 and 3) on opposite sides of compartment 14, as well as part of an integral water circulation system 50, water temperature regulation system 52, aeration system 54 and filtration system 56. It will be understood certain parts of these systems may also extend to other areas in housing 12.

Figure 3:
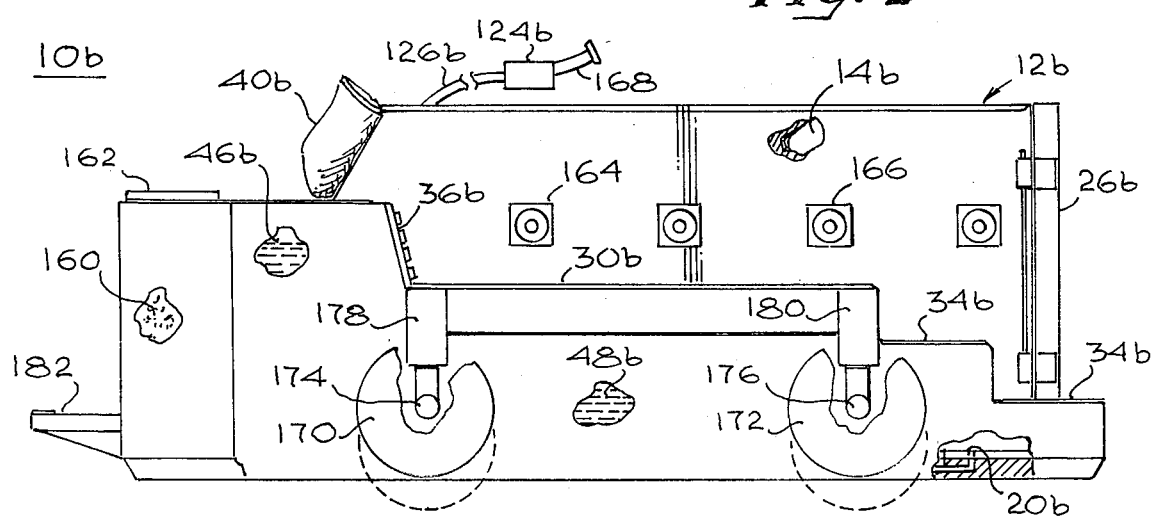
FIG. 3 is a schematic diagram of the circulation, temperature regulation and filtration systems of the spa of FIG. 1.
Figure 3:
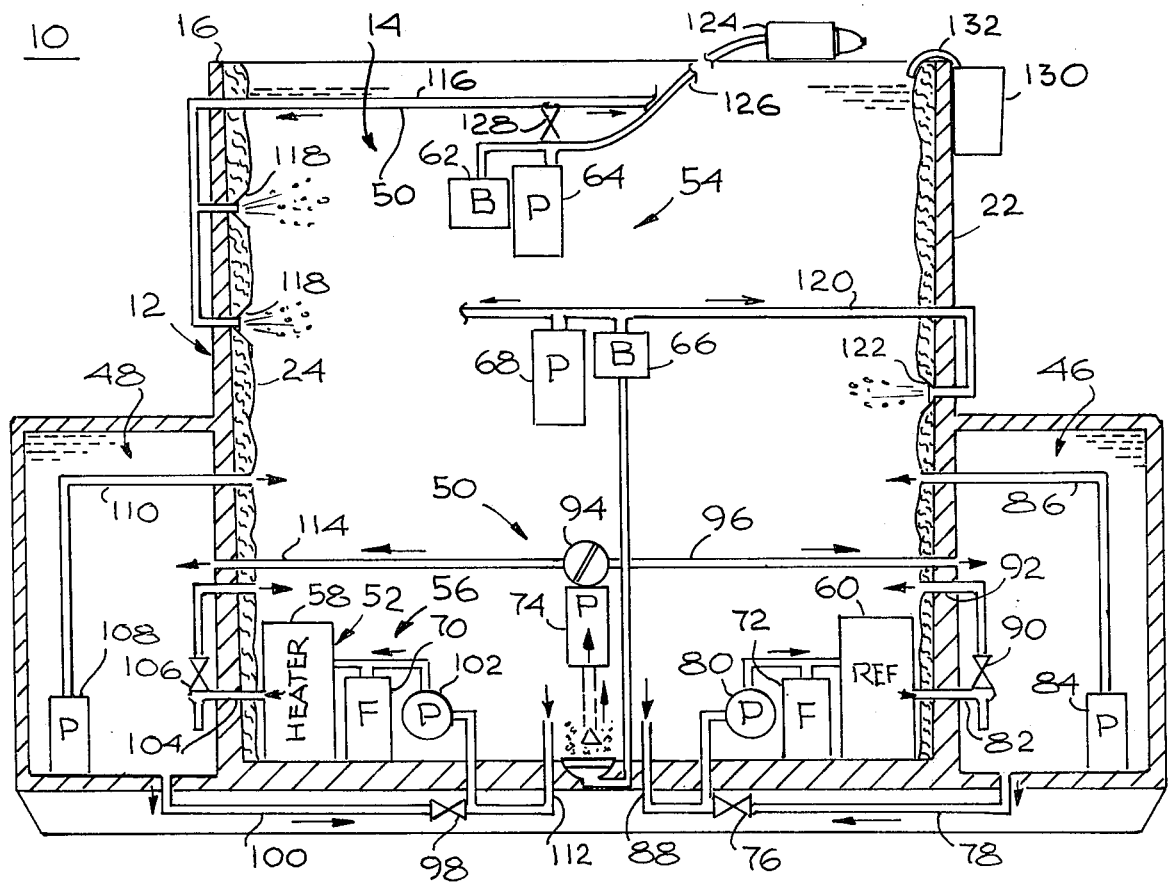

As can be seen from schematic FIG. 3, circulation system 50 includes various pipes, valves and pumps, system 52 comprises heater 58 and a refrigerator 60 and system 54 includes upper blower 62 and associated pump 64 and lower blower 66 and associated pump 68. System 56 includes filters 70 and 72 associated with the temperature regulation system, and a gross refuse filter screen, such as that shown in FIG. 4, and an associated sump pump 74 (FIG. 3).

Control panel 36 is connected to systems 50 and 52 and also systems 54 and/or 56, if desired, to preferably electrically regulate the operation of spa 10. Thus, when it is desired to use spa 10, usually water in cold water chamber is caused to be refrigerated by operating two way valve 76 in exit line 78 and operating pump 80 to pass water from chamber 46 through filter 72 and into and through refrigerator 60, then through line 82 back by two-way valve 90 into chamber 46. Pump 80 can then be shut off and pump 84 in chamber 46 can be operated via panel 36 to pump refrigerated water out line 86 and into compartment 14 to the desired level. This refrigerated water is used normally to treat only the legs of a horse and need only be a few feet deep in compartment 14.

Once the cold water is in compartment 14 it can be maintained cold by recirculating it periodically or continuously through refrigerator 60 from line 88 by operating pump 80. It exits refrigerator 60 through line 82 and then through two-way valve 90 and line 92 back into compartment 14.

After completion of the cold therapy, sump pump 74 and return valve 94 are activated to return the cold water from compartment 14 through line 96 back into chamber 46. As previously mentioned, a filter (not shown) is placed before the inlet to sump pump 74 to collect any gross horse refuse in compartment 14 during operation of pump 74. Filter 72 also purifies the water during the cold water treatment.

A substantially identical system is provided to supply hot water to compartment 14. Thus, water in chamber 48 is first heated by turning two-way valve 98 the proper direction to exit line 100, and operating pump 102, thus allowing water to pass from chamber 48 into filter 70, through heater 58 and out line 104 with two-way valve 106 operated to return the heated water to chamber 48. Once a sufficient volume of heated water is provided in chamber 48, pump 108 causes it to pass through line 110 and into compartment 14 to the desired level. Warm or hot water is generally applied to the horse over its entire body up to the neck. In order to maintain the water at the desired elevated temperature, water from compartment 14 is allowed to periodically or continuously exit through line 112 by turning valve 98 in the proper direction and operating pump 102, such water passing into and through filter 70, heater 58, line 104, valve 106 suitably positioned and then back into compartment 14. Upon completion of the therapy, sump pump 74 and return valve 94 are operated to return the hot water to chamber 48 through line 114 after the water passes through the gross filter (not shown).

During hot water therapy in compartment 14, upper whirlpool blower 62 and pump 64 may be operated to aerate hot water and pass it through upper lines generally designated 116 to jet nozzles 118 positioned in the upper portion of sidewalls 22 and 24 of compartment 14. Typically, a mixture of 50% air and 50% water (by volume) is delivered by the nozzles 118. A second lower whirlpool jet system can be used in the hot water by operating lower blower 66 and pump 68 to pass aerated water through lines generally designated 120 to jet nozzles 122 positioned low down in sidewalls 22 and 24 and in or under the flooring 20 (not shown) of compartment 14. The bottom whirlpool jets direct air bubbles upwardly through the water to provide therapy and also buoy up the horse, taking weight off its feet and relaxing it.

Optionally, the spa 10 also includes a hand-held mobile water-air jet nozzle unit 124 releasably connected to line 116 by a flexible conduit 126. Preferably, unit 124 can provide for pulsating jets, so that individual trouble areas of the horse can be intimately treated with unit 124. A valve 128 may be provided upstream of the point of connection of conduit 126 and line 116 so that unit 124 can be used with or without simultaneous use of nozzles 118. If desired, flexible, mobile hand-held units (not shown) capable of providing sonic or ultrasonic vibrations can be operated by panel 36 and extended into compartment 14 for therapeutic use. In fact, unit 124 can be designed so as to sonically vibrate, if desired.

As shown in FIG. 3, spa 10 may also be provided with a treating tank, or the like, such as tank 130, containing medicinals, chemicals, etc. Tank 130 is releasably secured by hook 132 to the outside of the upper end of sidewall 22 and is adapted to be tilted over into compartment 14 to dispense its contents into water therein. If desired, the medicinals can be fed directly into the water circulation system. It will be understood that the arrangement of circulation, temperature regulation, aeration and filtration components within housing 12 can be varied considerably, while still providing the advantages of the present invention.

Figure 2:
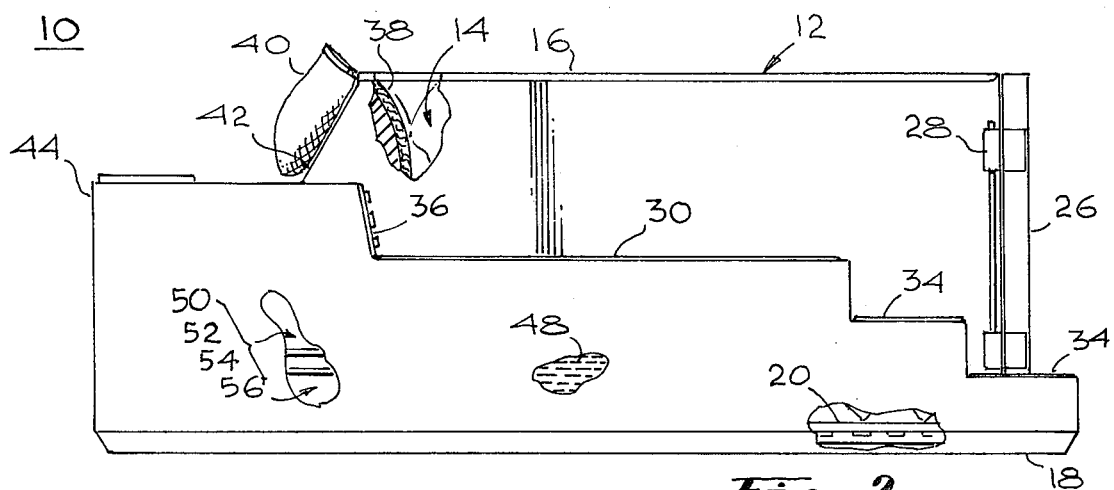
FIG. 2 is a schematic side elevation, partly broken away of the improved horse spa of FIG. 1.
Figure 4:
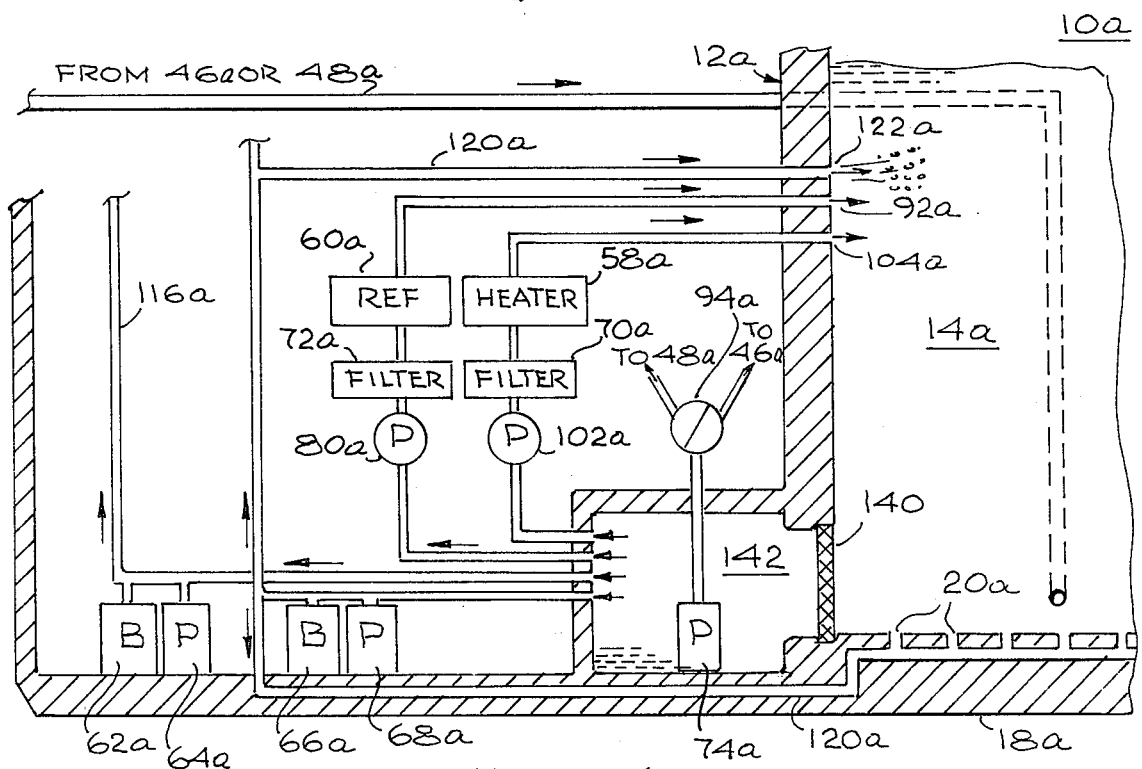
FIG. 4 is a schematic partial section of a portion of a version of the circulation, temperature regulation and filtration systems utilized in the spa of FIG. 1.

FIG. 4 illustrates schematically a slightly different arrangement of components than shown in FIG. 2. Thus, in FIG. 4 housing 12a in spa 10a is illustrated which is similar to housing 12. Components similar to those of spa 10 bear the same numerals but are succeeded by the letter "a". Both blower 62a and blower 66a, as well as pumps 64a and 68a are disposed near the bottom of housing 12a, while line 120a is shown to extend to openings in floor 20a for delivery of air bubbles up through compartment 14a. A gross refuse filter screen 140 preferably readily replaceable, is shown extending across an opening between compartment 14a and a chamber 142 containing sump pump 74a, so that gross refuse in compartment 14a can be trapped and removed in filter 140. Refrigerator 60a, filter 72a and pump 80a, as well as heater 58a, filter 70a and pump 102a are shown, together with associated lines 92a and 104a in a slightly different orientation than that depicted in FIG. 2, but perform similar functions.

It will be understood that all components of spas 10 and 10a can be fabricated of readily available durable materials. It will be further understood that the control panel 36 can operate electrically to remotely control the various pumps, blowers and valves schematically shown in FIGS. 1-4, as well as the refrigerators and heaters and that a source of direct or alternating current (not shown) is provided in housing 12. Mechanical actuation can be provided for if desired. Thus, spas 10 and 10a are compact, simple, inexpensive and highly effective to therapeutically treat horses. They can be made light enough in weight to be easily lifted by a fork lift into the bed of a truck for transportation.

A second preferred embodiment of the improved spa of the present invention is schematically depicted in FIG. 5. Thus, FIG. 5 shows spa 10b which is substantially identical in most respects to spa 10. Components of spa 10b similar to those of spa 10 bear the same numerals but are succeeded by the letter "b". Spa 10b includes a housing 12b defining a central horse therapy compartment 14b flanked by integral hot and cold water storage chambers 46b and 48b. Water circulation, heating, cooling, aerating and filtration systems are disposed in housing 12b and function similar to those of spa 10.

Spa 10b is provided with a feed bag 40b and a grain storage compartment 160 in the front portion of housing 12b. Compartment 160 has hinged access lid 162. Moreover, compartment 14b has spaced radiation ports 164 in the sidewalls thereof with rotatable radiation (ultraviolet and/or infrared and/or diathermy) light devices 166 sealingly mounted therein for selective radiation of parts of a horse when in compartment 14b. In addition, housing 12b is provided with a portable hand-held aerated water jet sprayer 124b with vibrator component 168 connected by a flexible conduit 126b to the circulation and aeration systems (not shown) in housing 12b.

On housing 12b is fitted a pair of interconnected retractable wheels 170 and 172 on each side thereof. Wheels 170 and 172 are connected to horizontal axles 174 and 176, respectively, in turn connected to dual vertical hydraulic rams 178 and 180, respectively, which operate to simultaneously move all wheels 170 and 172 between the retracted inoperative position shown in solid outline in FIG. 5 and the operative extended position shown in dotted outline in FIG. 5. In the latter position, housing 12b can be easily transported from place to place, as by pulling it by connection with front towing bracket 182. Accordingly, spa 10b has all the functions and advantages of spa 10, plus improved mobility.

If desired, baffle means can be incorporated near the exit of the fill ports for compartment 14 to avoid "spooking" the horse by onrushing water during filling of the tank. It has also been found adviseable to add an air blower to the whirlpool blowers, especially for the lower jets, to insure adequate air supply for water aeration.

An additional embodiment (not shown), is to provide a therapy compartment that has its sides conform to the general outline of a horse in order to minimize the distance between the therapy jets located in the sides and the various parts of the horse. Such a compartment should be well padded to avoid injury to the horse.

Various other modifications, changes, alterations and additions can be made in the improved horse spa of the present invention, its components and their parameters. All such changes, modifications, alterations and additions as are within the scope of the appended claims form part of the present invention.

What is claimed is:

1. An improved portable horse spa, said spa comprising, in combination:
(a) a hollow housing adapted to be placed on the ground and defining:
i. a horse therapy compartment having a closed bottom, closed sides and closed ends, at least one of said ends having an openable door, said therapy compartment and door being watertight, and
ii. a plurality of integral storage chambers adjacent to said therapy compartment bearing water for said therapy compartment and stabilizing said housing against tilting;
(b) water temperature regulating means in said housing;
(c) water circulation means in said housing connected to said therapy compartment, temperature regulating means and said water chambers for movement of water therebetween;
(d) remote control means disposed on the outside of said housing and connected to said circulation means and said temperature regulating means for control thereof;
(e) water purification means in said housing connected to said water circulation means and/or said therapy compartment, and
(f) wherein said housing defines thermally insulated hot and cold water chambers on opposite sides of said therapy compartment and wherein said temperature regulating means include refrigeration means interconnected to said cold water chamber and heating means interconnected to said hot water chamber.

2. The improved horse spa of claim 1 wherein said therapy compartment is open topped and wherein said spa includes water aeration means connected to said water circulation means to at least one of said chambers and/or said therapy compartment to aerate said water and provide a whirlpool effect in said therapy compartment.

3. The improved horse spa of claim 2 wherein said water purification means includes a lower filtration unit for removal of gross refuse and one or more upper filtration units connected to said water circulation means for purification of circulating water.

4. The improved horse spa of claim 3 wherein said lower filtration unit includes a sump pump and a replaceable filter screen.

5. The improved horse spa of claim 2 wherein said water circulation means includes aerated water jet inlets in the upper portion of said therapy compartment and aerated water jet inlets in the lower portion of said therapy compartment, said lower inlets helping to lift up a horse when in water in said therapy compartment.

6. The improved horse spa of claim 5 wherein said water circulation means includes a hand-held maneuverable aerated water jet unit.

7. The improved horse spa of claim 6 wherein said hand-held water jet unit includes means for pulsing a water jet.

8. The improved spa of claim 2 wherein pulsating means are connected to the water circulation means to provide pulsating water jets.

9. The improved horse spa of claim 1 wherein said water circulation means include separately openable means for:
(a) passing water between said cold water chamber and said refrigeration means;
(b) passing refrigerated water between said cold water chamber and said therapy compartment; and
(c) passing cold water between said therapy compartment and said refrigeration means.

10. The improved horse spa of claim 1 wherein said water circulation means includes separately operable means for:
(a) passing water between said hot water chamber and said heating means;
(b) passing hot water between said hot water chamber and said therapy compartment; and (c) passing hot water between said therapy compartment and said heating means.

11. An improved portable horse spa, said spa comprising, in combination:
(a) a hollow housing adapted to be placed on the ground and defining:
   i. a horse therapy compartment having a closed bottom, closed sides and closed ends, at least one of said ends having an openable door, said therapy compartment and door being watertight,
   ii. a plurality of integral storage chambers adjacent to said therapy compartment bearing water for said therapy compartment and stabilizing said housing against tilting; and
   iii. at least one of said chambers holding hot water and another of said chambers holding cold water therein;
(b) water temperature regulating means in said housing;
(c) water circulation means in said housing connected to said therapy compartment, temperature regulating means and said water chambers for movement of water therebetween;
(d) remote control means disposed on the outside of said housing and connected to said circulations means and said temperature regulating means for control thereof; and
(e) water purification means in said housing connected to said water circulation means and/or said therapy compartment, wherein said therapy compartment includes ports and wherein said spa includes moveable high intensity lamps which can beam selected radiation into said therapy compartment through said ports.

12. The improved horse spa of claim 11 wherein said lamps beam radiation selected from diathermy, infrared and ultraviolet radiation.

13. An improved portable horse spa, said spa comprising, in combination:
(a) a hollow housing adapted to be placed on the ground and defining:
   i. a horse therapy compartment having a closed bottom, closed sides and closed ends, at least one of said ends having an openable door, said therapy compartment and door being watertight, and
   ii. a plurality of integral storage chambers adjacent to said therapy compartment bearing water for said therapy compartment and stabilizing said housing against tilting;
(b) water temperature regulating means in said housing;
(c) water circulation means in said housing connected to said therapy compartment, temperature regulating means and said water chambers for movement of water therebetween;
(d) remote control means disposed on the outside of said housing and connected to said circulation means and said temperature regulating means for control thereof;
(e) water purification means in said housing connected to said water circulation means and/or said therapy compartment;
(f) wherein said housing defines thermally insulated hot and cold water chambers on opposite sides of said therapy compartment and wherein said temperature regulating means include refrigeration means interconnected to said cold water chamber and heating means interconnected to said hot water chamber;
(g) wherein said therapy compartment is open topped and wherein said spa includes water aeration means connected to said water circulation means to at least one of said chambers and/or said therapy compartment to aerate said water and provide a whirlpool effect in said therapy compartment; and
(h) wherein air blower means are connected to the aeration means to improve aeration of the water.

* * * * *